M. S. STONE.
BELT FASTENER.
APPLICATION FILED MAR. 19, 1917.
1,232,731.
Patented July 10, 1917.
2 SHEETS—SHEET 1.
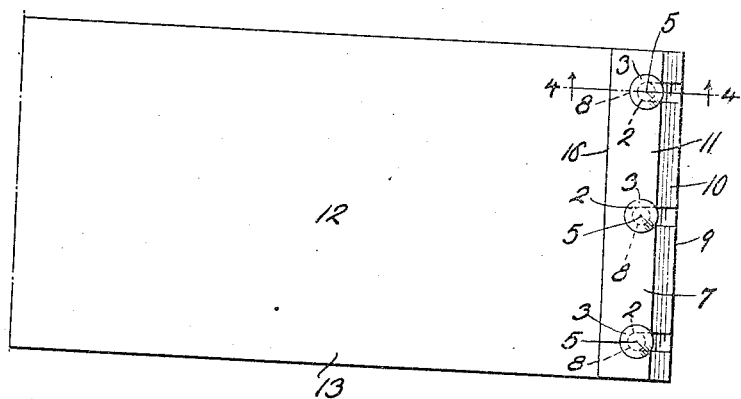
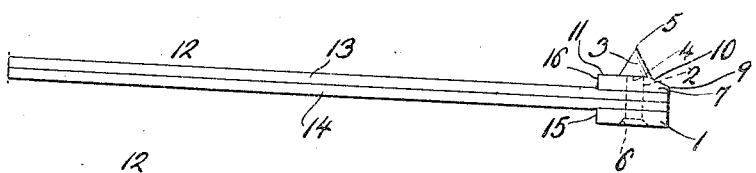
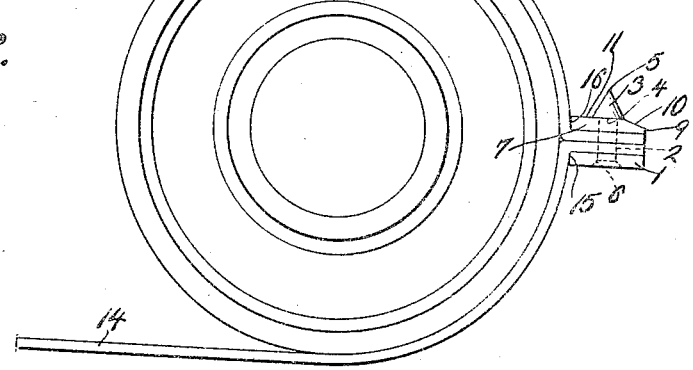
Witnesses
H. P. Harwood
C. R. Ziegler
Inventor
Mitchell S. Stone.
By
Joshua R. H. Potts
His Attorney M. S. STONE.
BELT FASTENER.
APPLICATION FILED MAR. 19, 1917.
1,232,731.
Patented July 10, 1917.
2 SHEETS—SHEET 2.
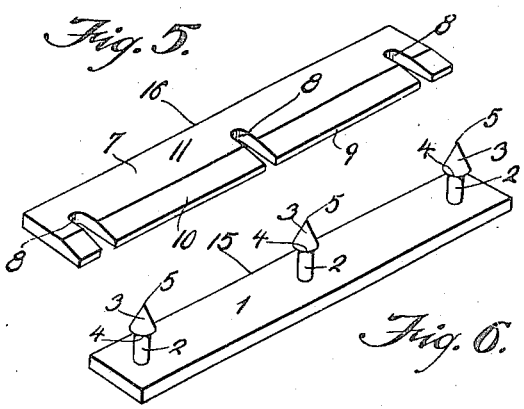
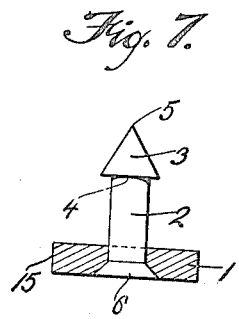
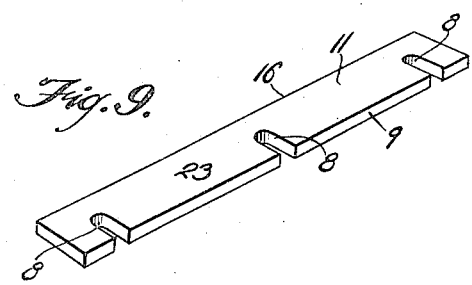
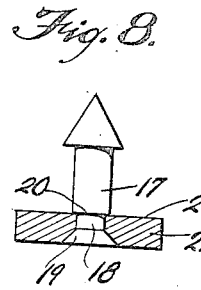
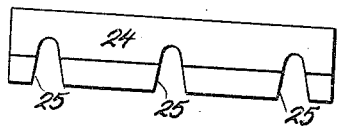
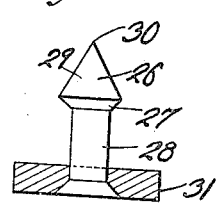
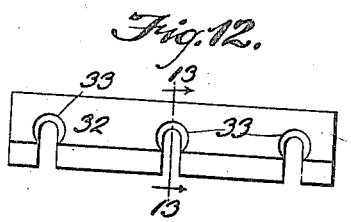
Witnesses
H. P. Harwood.
C. R. Ziegler.
Inventor
Mitchell S. Stone
By Joshua R. H. Potts.
His Attorney

UNITED STATES PATENT OFFICE.

MITCHELL S. STONE, OF PHILADELPHIA, PENNSYLVANIA.

BELT-FASTENER.

1,232,731.

Specification of Letters Patent.   Patented July 10, 1917.

Application filed March 19, 1917.   Serial No. 155,747.

*To all whom it may concern:*

Be it known that I, MITCHELL S. STONE, a citizen of the United States, residing at Philadelphia, in the county of Philadelphia and State of Pennsylvania, have invented certain new and useful Improvements in Belt-Fasteners, of which the following is a specification.

My invention consists of an improved belt fastener, one object of my invention being to provide a fastener which can be quickly and easily applied to a belt and which will securely bind the ends of the belt together.

Another object is to so construct my improved belt fastener that, when it is attached to a belt which is under tension, the belt will act to keep the fastener in position.

A further object is to so make my invention that it will be of a simple and inexpensive construction.

These objects, and other advantageous ends which will be described hereinafter, I attain in the following manner, reference being had to the accompanying drawings in which—

Figure 1 is a fragmentary face view of a belt having its ends secured together with my improved fastener.

Fig. 2 is an edge view of Fig. 1.

Fig. 3 is a side elevation showing the belt illustrated in Figs. 1 and 2 as it appears when passing around a pulley.

Fig. 4 is an enlarged section on the line 4—4 of Fig. 1.

Fig. 5 is a perspective view of a notched plate which forms a part of my invention.

Fig. 6 is a perspective view of another portion of my invention.

Fig. 7 is a transverse section through the plate illustrated in Fig. 6.

Fig. 8 is a sectional view of similar nature to Fig. 7 but showing a modified form of securing pin which forms a part of my invention.

Fig. 9 is a perspective view showing a modified form of the notched plate illustrated in Fig. 5.

Fig. 10 is a plan view of another form of notch plate.

Fig. 11 is a transverse sectional view through a plate such for example as the plate shown in Fig. 6 showing a modified form of piercing head which I may employ.

Fig. 12 is a plan view of another form of notched plate which I may use.

Fig. 13 is an enlarged transverse section on the line 13—13 of Fig. 12.

Referring to Figs. 1 to 7 inclusive of the drawings, 1 represents an elongated plate, preferably of sheet metal, which has pins 2 secured thereto and which project from one face thereof. These pins are distributed throughout the length of the plate and each pin has its outer free end provided with a head 3.

The head 3 at its point of junction or intersection with the pin 2, is of greater width than the pin 2, and thus provides a shoulder 4. The heads 3 taper outwardly to form points 5. As illustrated in Figs. 2, 3, 4, and 7, the pin 2 are secured to the plate 1 by forcing them through holes in the plate and then riveting the ends 6 within the plate.

A second plate 7 has notches 8 extending inwardly from the edge 9, and these notches are designed to register and receive the portions of the pins between the heads 3 and the plate 1. The plate 7 is tapered on its outer surface as shown at 10. This tapered portion acts as a wedge, as will hereinafter be more fully described, and extends from the edge 9 to the outer surface 11 of said plate.

When it is desired to secure the ends of a belt together, such for example as the belt 12 shown in Figs. 1 to 4, the runs 13 and 14 of the belt are laid one upon the other with their side edges registering with each other and their ends registering with each other. The pins 2 are then pressed against the belt, so that they pierce both runs of the belt while the belt is in the position shown in Fig. 2. The plate 7 is then forced between the heads 3 of the pins and the adjacent run of the belt until the upper surface 11 is moved into contact with the shoulders 4 of the pin heads 3 and the pins are in position within the notches 8. This causes a slight compression of the belt between the plates and the resilient nature of the belt serves to secure the plates against relative movement.

When the parts are in this position, and the belt is placed around a pulley as shown in Fig. 3, the tension exerted on the runs of said belt serves to securely hold the plate 7 against the pins 2, so that the rear edges 15 and 16 of the plates 1 and 7 bear against the outer surface of the belt.

In other words, any tension which is placed upon the belt tends to move the plate 7 toward the end of the belt, and since it is resisted by the pins, it is practically impossible for the parts to become loosened during the movement of the belt around its pulleys. If desired, the pins may be inserted within the plate 1 in the manner shown in Fig. 8. In this construction, the pin 17 has a portion 18 of reduced diameter and this portion terminates in the riveted end 19. Furthermore, the reduction in diameter produces a shoulder 20 which bears upon the surface 21 of the plate 22, so that said plate 22 is bound between the riveted end 19 and the shoulder 20.

Instead of having the notched plate provided with a beveled edge, I may make this notched plate rectangular in cross section, such for example as shown at 23 in Fig. 9. In all other respects this plate is similar to that illustrated in Fig. 5, and I have therefore given similar parts like reference numerals, however, it will be understood that the tapered or wedge portion 10, as illustrated in Fig. 5, assists in assembling the several parts, since it produces a narrow edge which may be easily inserted between the head 3 and the adjacent run of the belt.

In Fig. 10, I have shown another form of notch plate 24 in which the notches 25 are tapered inwardly. This form of plate is of particular advantage when used in connection with pins formed in the manner illustrated in Fig. 11 where the heads 26 are tapered in two directions, the portions 27 being flared outwardly from the body portion 28 of the pins, while the portions 29 taper to form points 30 in a manner similar to the heads 3 above mentioned.

In this construction, the flared portions 27 serve as cams or wedges to force the notched plate toward the plate 31 and to bind the ends of the belt therebetween, it being noted that when used in connection with the tapered notches, that as the body portions 28 approach the inner or narrowed ends of the notches, they will gradually ride toward the body portion 28 and thereby move the notched plate toward the plate 21.

In Fig. 12, I have shown a notched plate of the same general construction as the plate 7 with the exception that I provide the plate on its outer surface 32 with recesses 33 which serve as sockets after the plate has been moved into its proper position to receive the shouldered portions of the heads, the action being as follows:—As the notched plate is forced under the shoulders of the heads, the belt ends are slightly compressed and tend to re-act to force the plates apart. Therefore, when the shouldered portions of the head come in register with the recesses 33, the belt ends are permitted to expand to such extent that the shoulders 4 of the heads fit within said recesses and positively lock them in place.

My invention is particularly adapted for use on high speed machines in which the belts are made of canvas or other tough fabric, however, it will be noted that it may also be used on belts made of leather or other material.

With the aid of my invention, the ends of a belt may be quickly and securely fastened together and the joint will be extremely durable. I preferably make the plates of substantially the same length as the width of the belt so that they may be used on belts which are shifted from time to time from a loose pulley to a driving pulley without chance of interference with the belt-shifting device, since it will be noted that the ends of the plates are substantially flush with the edges of the belt.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A belt fastener, comprising two plates, one of said plates having pins spaced apart and provided with portions forming shoulders and designed to pierce overlapped registering end portions of a belt, the other of said plates having notches in one of its edges designed to register with said pins, said latter plate being designed to be slid edgewise to engage between the shouldered portions of the pins and the belt to secure the end portions between it and the first-mentioned plate, substantially as described.

2. A belt fastener comprising two plates, one of said plates having pins projecting therefrom, said pins being provided with heads designed to pierce overlapped registering end portions of a belt, the other of said plates having notches in one of its edges for registry with the pins between the heads and said first plate, substantially as described.

3. A belt fastener comprising two plates, one of said plates having pins projecting therefrom, said pins being provided with heads designed to pierce overlapped registering end portions of a belt the other of said plates having notches in one of its edges for registry with the pins between the heads and said first plate, said notched plate having its notched edge tapered and intersecting the notched portions, substantially as described.

4. A belt fastener comprising two plates, one of said plates having pins projecting therefrom, said pins being provided with heads, the other of said plates having notches in one of its edges for registry with the pins between the heads and said first plate, said notched plate having recesses formed in its outer surface, said recesses intersecting said notches and designed to receive the heads of said pins due to the expansion of the belt in the direction of its thickness, substantially as described.

5. A belt fastener comprising two plates, one of said plates having pins projecting therefrom, said pins being provided with heads designed to pierce overlapped registering end portions of a belt, said heads being of greater width than the pins at their point of intersection therewith and tapering toward their free ends, the other of said plates having notches in one of its edges for registry with the pins between the heads and said first plate, substantially as described.

In testimony whereof I have signed my name to this specification in the presence of two subscribing witnesses.

MITCHELL S. STONE.

Witnesses:
MARY A. INGLAR,
CHAS. E. POTTS.

Copies of this patent may be obtained for five cents each, by addressing the "Commissioner of Patents, Washington, D. C."